(12) United States Patent
Lee

(10) Patent No.: US 8,391,922 B2
(45) Date of Patent: Mar. 5, 2013

(54) SUBSCRIBER IDENTIFICATION MODULE CARD AND PORTABLE WIRELESS TERMINAL USING THE SAME

(75) Inventor: Seung-Soo Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1190 days.

(21) Appl. No.: 11/837,325

(22) Filed: Aug. 10, 2007

(65) Prior Publication Data

US 2008/0119229 A1   May 22, 2008

(30) Foreign Application Priority Data

Nov. 21, 2006   (KR) .................. 10-2006-0114972

(51) Int. Cl.
*H04B 1/38* (2006.01)
(52) U.S. Cl. ......... 455/558; 365/229; 455/571; 455/572
(58) Field of Classification Search ............. 455/127.1, 455/127.5, 556.1, 558, 571, 572, 574; 379/354–357, 379/412, 413
See application file for complete search history.

(56) References Cited

U.S. PATENT DOCUMENTS

| | | | | |
|---|---|---|---|---|
| 5,047,988 | A * | 9/1991 | Mizuta | 365/229 |
| 5,646,977 | A * | 7/1997 | Koizumi | 455/411 |
| 6,226,189 | B1 * | 5/2001 | Haffenden et al. | 361/814 |
| 2003/0217210 | A1 | 11/2003 | Carau | |
| 2004/0062112 | A1 * | 4/2004 | Nishizawa et al. | 365/202 |

FOREIGN PATENT DOCUMENTS

| | | | |
|---|---|---|---|
| JP | 2004-5630 A | * | 8/2004 |
| KR | 1020060066913 | | 6/2006 |

* cited by examiner

*Primary Examiner* — Wesley Kim
*Assistant Examiner* — Dinh P Nguyen
(74) *Attorney, Agent, or Firm* — The Farrell Law Firm, P.C.

(57) ABSTRACT

A Subscriber Identification Module (SIM) card for a portable wireless terminal is provided. The SIM card includes a SIM contact pad group which is exposed to an outer surface of the SIM card, and is electrically connected when the SIM card is placed in the portable terminal so as to identify subscriber information; a battery cell which is embedded in the SIM card, and is electrically connected when the SIM card is placed in the portable terminal so as to be used as an auxiliary power source; and a battery contact pad group which is electrically connected to the battery cell and is exposed to the outer surface of the SIM card; and a mode change element which is disposed to a lateral side of the SIM card and by which either an auxiliary battery function or a SIM function is selected by a user's manipulation.

15 Claims, 5 Drawing Sheets

SUBSCRIBER IDENTIFICATION MODULE CARD AND PORTABLE WIRELESS TERMINAL USING THE SAME

PRIORITY

This application claims priority under 35 U.S.C. §119(a) to a Korean Patent Application filed in the Korean Intellectual Property Office on Nov. 21, 2006 and assigned Serial No. 2006-114972, the contents of which are incorporated herein by reference.

BACKGROUND OF THE INVENTION

1. Field of the Invention

The present invention relates to a Subscriber Identification Module (SIM) card used in a portable wireless terminal, and in particular, to a SIM card that can be used as an auxiliary power source so that an emergency call can be made even when a main power source is exhausted, and a portable wireless terminal using the same.

2. Description of the Related Art

In general, a Subscriber Identification Module (SIM) card is detachably mounted to a portable wireless terminal based on a European-style Global Positioning System (GPS). Subscriber information and system information of the portable terminal are stored in the SIM card. Advantageously, even when the SIM card is mounted to another portable terminal, the stored information can also be used in that portable terminal. For example, when the SIM card, in which call history, user-set information, system information, and so on are stored, is mounted to a new portable terminal compatible with the SIM card, the new portable terminal can also use the previously stored information. Recently, due to this advantage, a User Identity Module (UIM) card is also widely used in the mobile wireless terminal.

The SIM card has a size of a plate-type flash memory. For electrical connection, the SIM card is inserted into a socket mounted on a card mounting portion. A plurality of contact pads each having a specific size are disposed to one surface of the SIM card, and physically come in contact with their corresponding connectors provided in the socket of the portable terminal. Specifically, the SIM card includes six SIM contact pads, i.e., as known in the art, SIM_GND, SIM_VDD, SIM_IO, SIM_CLK, SIM_RST, and SIM_VCC. These contact pads are electrically connected to the socket of the portable terminal by the use of their corresponding connectors.

Although the wireless mobile terminal has an excellent portability, the wireless mobile terminal cannot be used when a battery is out of power due to its limited capacity. For this reason, in general, a user carries an auxiliary battery pack in addition to a charging-type battery pack mounted to a backside of the portable terminal. If necessary, the user has to recharge the exhausted battery pack by connecting the portable terminal to a power source means.

However, if the battery pack mounted to the portable terminal is exhausted in a situation where the user is in a place where the battery pack cannot be recharged or in an emergency situation (e.g., accident), there is no way to use an emergency call function provided by the portable terminal.

SUMMARY OF THE INVENTION

An aspect of the present invention is to substantially solve at least the above problems and/or disadvantages and to provide at least the advantages below. Accordingly, one aspect of the present invention is to provide a Subscriber Identification Module (SIM) card capable of providing an auxiliary power source for an emergency call, and a portable wireless terminal using the same.

Another aspect of the present invention is to provide a SIM card capable of performing an emergency call function by simply changing a mode without having to use an additional power source, and a portable wireless terminal using the same.

Yet another aspect of the present invention is to provide a SIM card that can be used as an auxiliary power source so that an emergency call can be made even when a main power source is exhausted, and a portable wireless terminal using the same.

According to one aspect of the present invention, there is provided a SIM card for a portable wireless terminal. The SIM card includes a SIM contact pad group which is exposed to an outer surface of the SIM card, and is electrically connected when the SIM card is placed in the portable terminal so as to identify subscriber information; a battery cell which is embedded in the SIM card, and is electrically connected when the SIM card is placed in the portable terminal so as to be used as an auxiliary power source; and a battery contact pad group which is electrically connected to the battery cell and is exposed to the outer surface of the SIM card; and a mode change element which is disposed to a lateral side of the SIM card and by which either an auxiliary battery function or a SIM function is selected by a user's manipulation.

According to another aspect of the present invention, there is provided a portable wireless terminal. The portable wireless terminal includes a SIM card embedded with a battery cell; a socket on which the SIM card is mounted and which is electrically connected to the portable terminal; and a switching element for switching between a SIM mode and a battery mode according to a mode of the SIM card mounted on the socket.

Since the SIM card placed in the portable terminal may operate in two mode (i.e., the SIM mode and the battery mode), the SIM card may be used for the purpose of subscriber identification in a normal situation, and may be used as an auxiliary battery pack in an emergency situation so that an emergency call can be made using the portable terminal.

It is desirable that the user determines whether the SIM card will perform a SIM function or an auxiliary battery pack function through a simple key manipulation.

It is also desirable that, as a power supply contact point, the SIM card utilizes an unused pad of conventional contact pads, thereby saving space. Further, a SIM/battery contact pad may be selectively used as a SIM contact pad or a battery contact pad by changing a mode of the SIM card.

It is desired that the portable terminal further includes a switching element so that the SIM card can operate according to a mode selected by the switching element. For example, the SIM card of the portable terminal may change from the SIM mode to the battery mode upon detecting electrical connection of a battery detection contact pad.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Terminology used herein should be determined in consideration of functionality of the present invention, and it may be variable depending on user's or operator's intention, or customs in the art. Therefore, corresponding meaning should be determined with reference to the entire specification.

Although a slide-type portable terminal is depicted in the accompanying drawings, and a Subscriber Identification Module (SIM) card is mainly explained in the following descriptions, the present invention is not limited thereto. Thus, the present invention may also apply to various portable terminals using the SIM card or the like.

Figure 1:
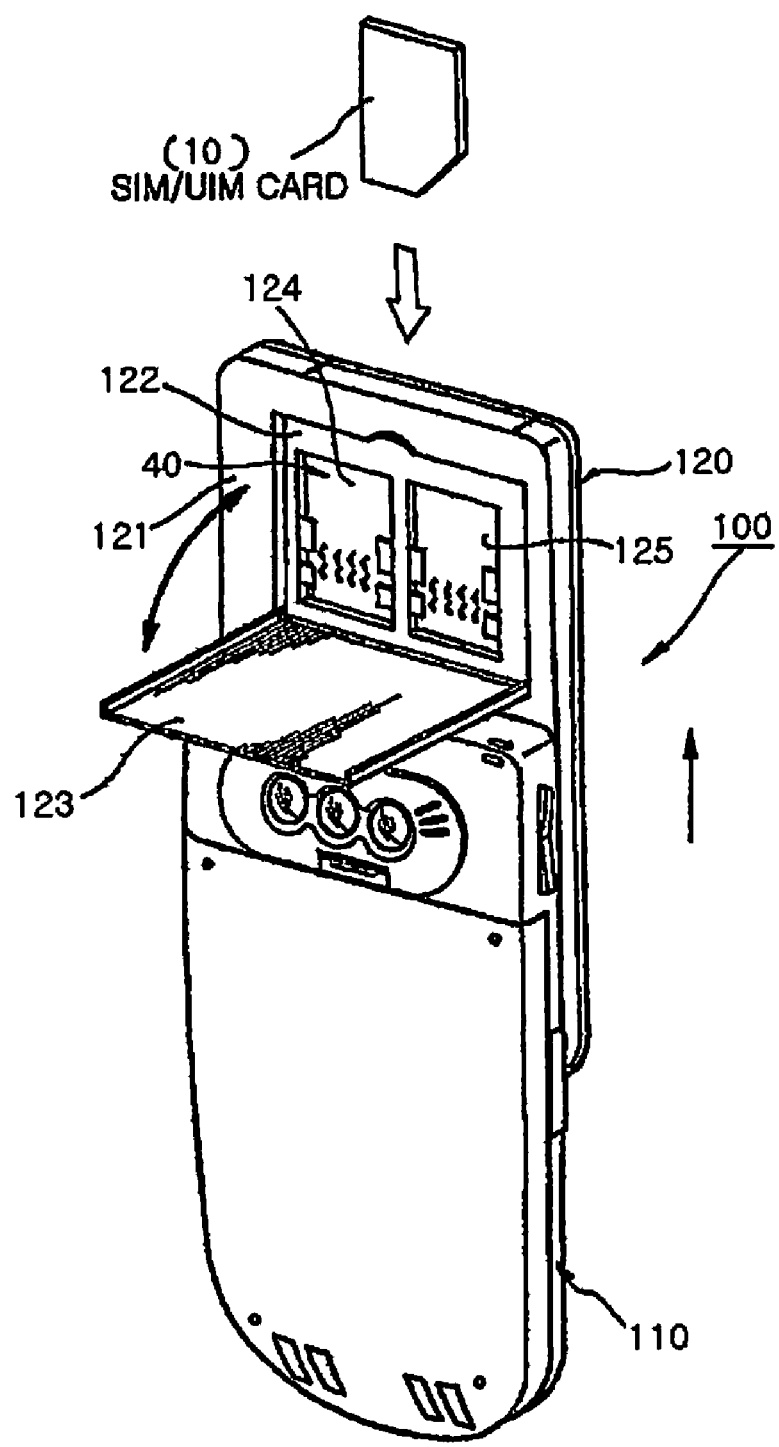
FIG. 1 is a rear perspective view of a portable terminal using a Subscriber Identification Module (SIM) card according to the present invention.

FIG. 1 is a rear perspective view of a portable terminal using a SIM card according to the present invention.

In FIG. 1, a portable terminal 100 has a structure in which a SIM card 10 can be attached to and detached from a backside 121 of a slide body 120. The SIM card 10 is inserted into a card-mounting portion 124 provided to the backside 121 of the slide body 120 in a state that the slide body 120 is open. A card-mounting portion 125 may be further provided for a User Identification Module (UIM) card.

A socket 40 is mounted to the card-mounting portion 124 so as to fix the SIM card 10 placed thereon. Also, the socket 40 is electrically connected to the portable terminal 100. A plurality of connectors are directly disposed on the card mounting portion 124, and brackets 42 (see FIG. 4) are provided at both ends of the card-mounting portion 124 so as to fix the inserted SIM card 10. Alternatively, a SIM card socket (not shown) may be independently provided to the portable terminal 100 so that the SIM card 10 is inserted into this socket. The connectors may either be directly disposed on the card mounting portion 124 or be provided inside a socket. In both cases, for all portable terminals using the SIM card 10, when the connectors are electrically connected to contact pads of the SIM card 10, the connectors are disposed at predefined locations while being spaced apart from one another by the same distance.

As a power source, a battery pack is detachably coupled to a backside of a main body 110 by the aid of a locker. The card-mounting portion 124 is disposed to the backside 121 of the slide body 120. The card-mounting portion 124 has a concaved portion 122 which is located lower than the backside 121 of the slide body 120, and a further lower concave portion is included in the card-mounting portion 124. In one embodiment, the card-mounting portion 124 may be protected by a cover.

Although the SIM card 10 and its corresponding card-mounting portions 124 have been described, the present invention may also apply to a Code Division Multiple Access (CDMA) portable terminal using a UIM card and its corresponding card mounting portion 125.

Figure 2:
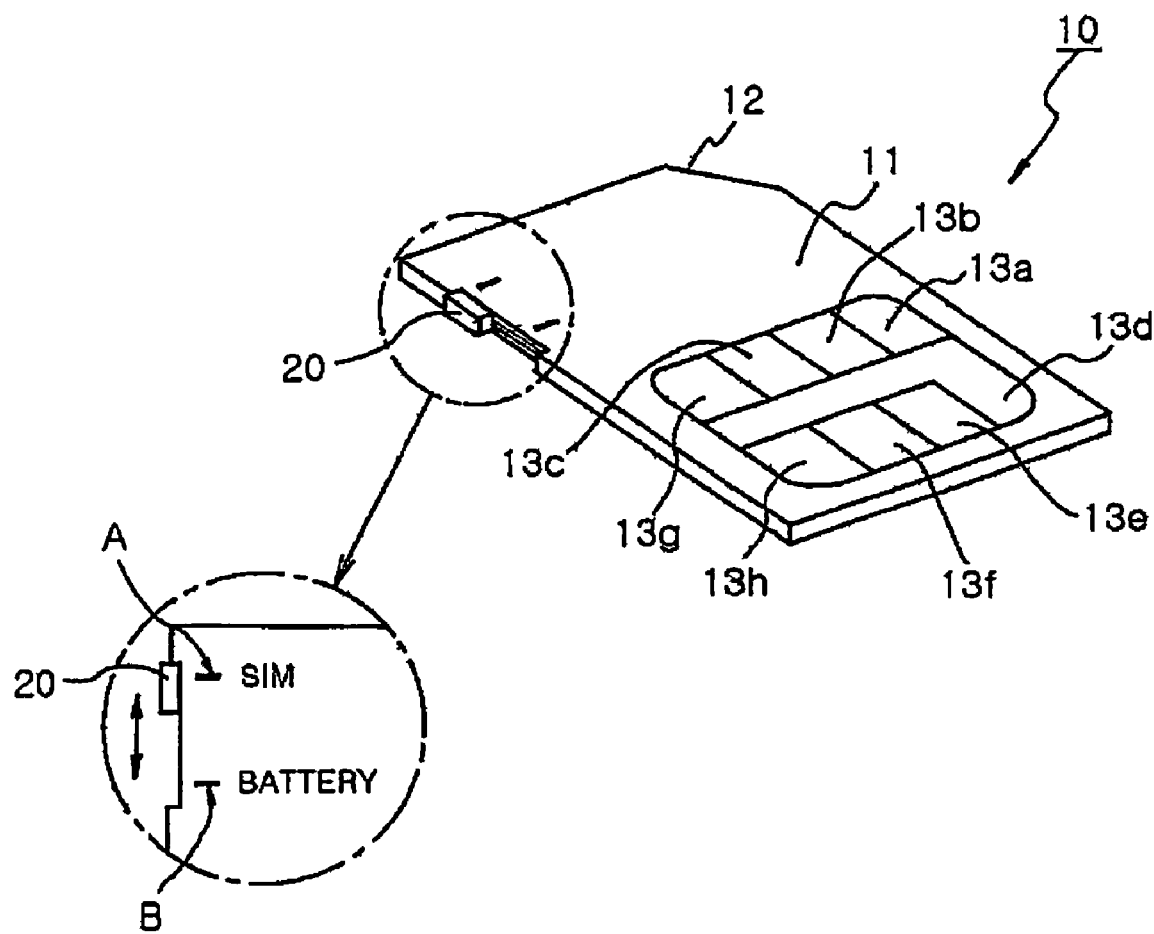
FIG. 2 is a perspective view of a SIM card according to the present invention.
Figure 3:
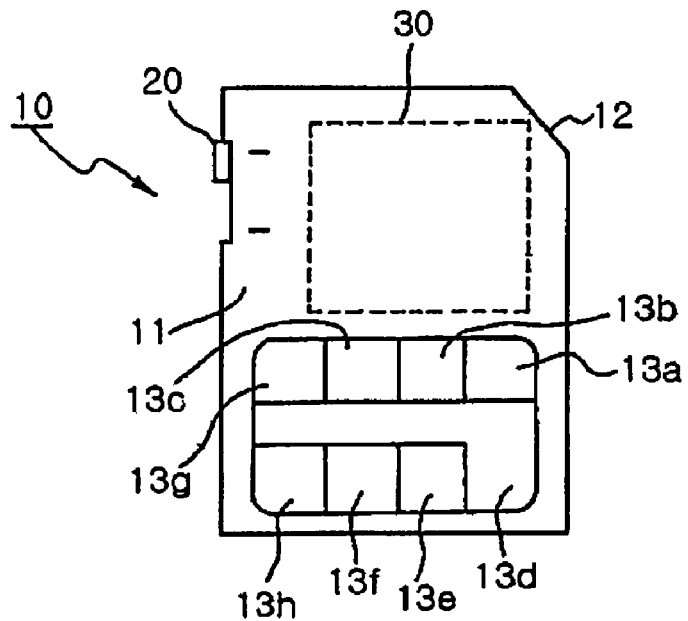
FIG. 3 is a plan view of a SIM card according to the present invention.

FIG. 2 is a perspective view of the SIM card 10 according to the present invention. FIG. 3 is a plan view of the SIM card 10 according to the present invention.

The SIM card 10 may operate in two modes, a SIM mode and a battery mode. When in the SIM mode, the SIM card 10 provides user information to perform a SIM function. When in the battery mode, the SIM card 10 is used as an auxiliary power source. To be used as the auxiliary power source, the SIM card 10 includes a battery cell 30. The battery cell 30 may provide a voltage in the range of about 3.4 to 4V which is suitable to drive the portable terminal 100. Although not shown, the battery cell 30 may further include a well-known Protection Circuit Module (PCM) circuit. In addition, the battery cell 30 may be recharged by the use of a dedicated charger.

In FIGS. 2 and 3, a plurality of contact pads 13a to 13h are exposed from a surface of the SIM card 10. As will be shown in FIGS. 5A and 5B, the contact pads 13a to 13h may be mounted or patterned on a substrate in a Surface Mounting Device (SMD) manner. One edge of the SIM card 10 may have a cutting portion 12 so that the SIM card 10 can be properly mounted.

The contact pads 13a to 13h are roughly classified into a SIM contact pad group (13a to 13f) and a battery contact pad group (13c, 13g, and 13h). The SIM contact pad group (13a to 13f) may include SIM contact pads SIM_VCC, SIM_RST, SIM_CLK, SIM_GND, SIM_IO, and SIM_VDD, each of which are well-known in the art. The battery contact pad group (13c, 13g, and 13h) may include a battery voltage contact pad 13c for providing power, a battery detection contact pad 13g for detecting the battery cell 30, and a battery type recognition contact pad 13h for detecting a battery type. The battery voltage contact pad 13c may be used in common with the SIM contact pad SIM_VCC, thereby saving space. Even when the battery voltage contact pad 13c and the SIM contact pad SIM_VCC have to be separately disposed in two different locations, an additional contact pad is not required since two contact pads are still available. This is because only the six SIM contact pads SIM_VCC, SIM_RST, SIM_CLK, SIM_GND, SIM_IO, and SIM_VDD are used out of a total of eight contact pads (known in the art). Preferably, the battery voltage contact pad 13c is used in common with the SIM contact pad SIM_VCC. However, the present invention is not limited thereto. Thus, the battery voltage contact pad 13c may be independently provided if there is enough space. In this case, connectors corresponding to the respective contact pads 13a to 13h have to be provided inside the socket of the portable terminal.

A mode change key 20 is provided to a lateral side of the SIM card 10. Mode change is achieved by vertically sliding the mode change key 20. Referring to FIG. 2, which shows an enlarged view of the SIM card 10, the SIM card 10 is switched to the SIM mode when the mode change key 20 moves to a position A. When the mode change key 20 moves to a position B, the SIM card is switched to the battery mode.

A configuration of the mode change key 20 and its mode change operation is described below according to the present invention.

Figure 4:
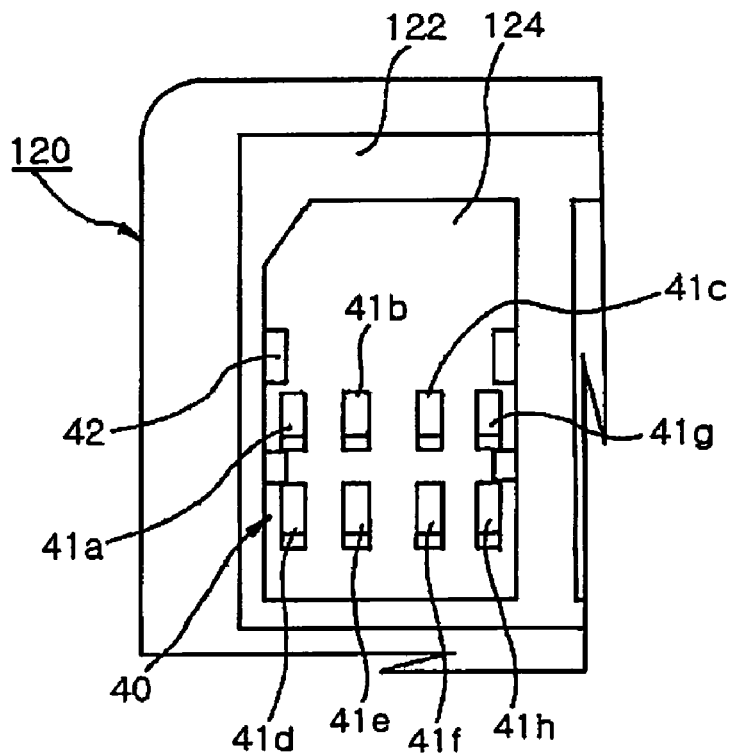
FIG. 4 illustrates a socket of a portable terminal using a SIM card according to the present invention.

FIG. 4 illustrates a socket 40 of a portable terminal 100 using a SIM card 10 according to the present invention. The connectors 41a to 41h protrude from a backside of the portable terminal 100. However, the present invention is not limited thereto, and thus an additional socket may be mounted on a circuit board of the portable terminal 100, and the SIM card 10 may be inserted into the socket.

Upon mounting the SIM card 10, SIM contact pads 13a to 13f and battery contact pads 13c, 13g, and 13h physically come in contact with the connectors 41a to 41h. This is possible because, even if all of the contact pads 13a to 13h come in contact with their corresponding connectors 41a to 41h, electrical connection is achieved only when a specific mode of the SIM card 10 is selected by the use of the mode change key 20.

Figure 5A:
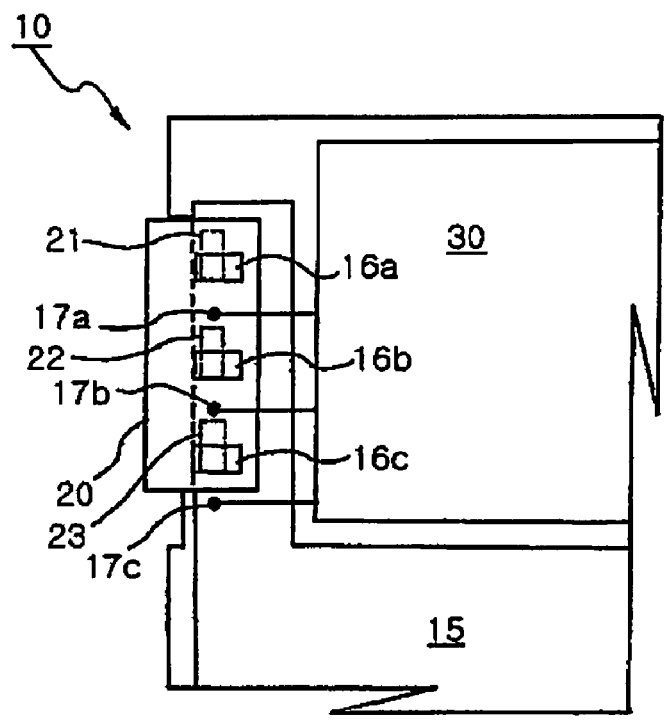
FIGS. 5A and 5B are views for explaining a SIM card used for two different purposes by manipulating a mode change key, according to the present invention.
Figure 5B:
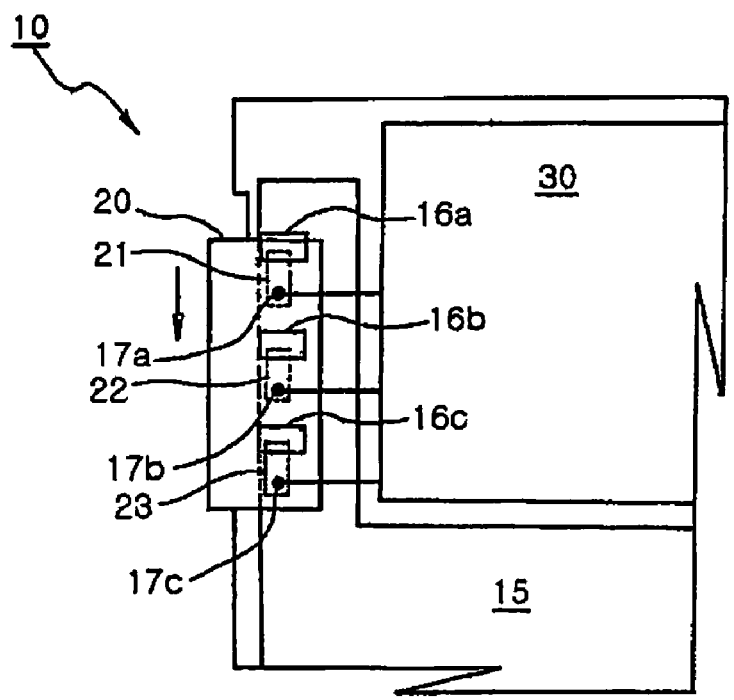

FIGS. 5A and 5B are views for explaining a SIM card 10 used for two different purposes by manipulating a mode change key 20, according to the present invention.

In FIG. 5A, contact pads (not shown) are provided on a substrate 15. A battery cell 30 is disposed out of the substrate 15. A Battery detection connection pad 16a, a battery type recognition connection pad 16b, and a SIM/battery (common) connection pad 16c are disposed on the substrate 15 while being spaced apart from one another by a specific distance. The connection pads 16a to 16c are electrically connected, by pattering or the like, to the battery detection contact pad 13g (see FIG. 3) exposed to an outer surface of the SIM card 10, the battery type recognition contact pad 13h (see FIG. 3), and the SIM/battery (common) contact pad 13c (see FIG. 3).

Three contact points 17a to 17c are respectively located adjacent to the connection pads 16a to 16c, and are electrically connected to the battery cell 30. The contact points 17a to 17c respectively correspond to a battery detection contact point 17a, a batter type recognition contact point 17b, and a battery power supply contact point 17c. The contact points 17a to 17c are not electrically connected to the connection pads 16a to 16c.

The mode change key 20 has a portion extended from the SIM card 10. In this portion, metal plates 21 to 23 may be provided to have a specific width with a specific interval. The metal plates 21 to 23 selectively connect the connection pads 16a to 16c with their corresponding contact points 17a to 17c.

When the mode change key 20 is positioned as shown in FIG. 5A, the connection pads 16a to 16c are not electrically connected to the contact points 17a to 17c. In this case, the SIM card 10 performs a SIM function.

When the mode change key 20 is positioned as shown in FIG. 5B, the metal plates 21 to 23 electrically connect the connection pads 16a to 16c with their corresponding contact points 17a to 17c. Thus, the contact points 17a to 17c of the battery cell 30 are electrically connected to the battery contact pads 13c, 13g, and 13h exposed to an outer surface of the SIM card 10. In this case, the SIM card 10 functions as an auxiliary battery pack.

Although the mode change key 20 moves vertically in this embodiment, the present invention may also be used with various other well-known switching mechanisms.

Figure 6:
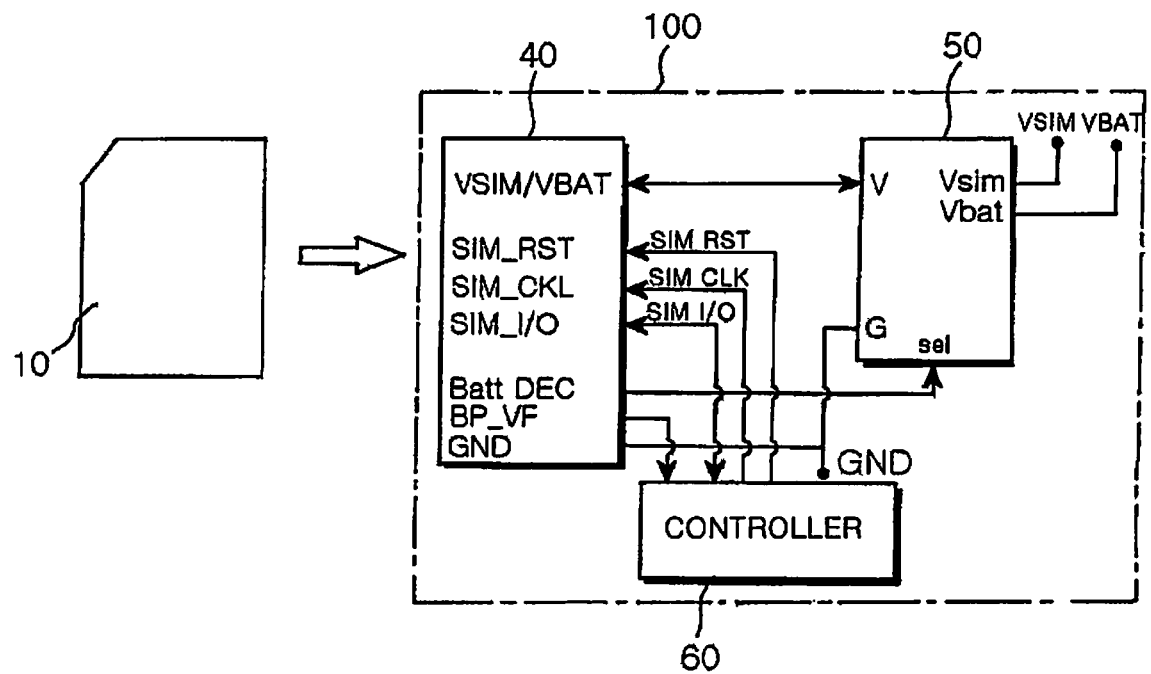
FIG. 6 is a block diagram of a portable terminal using a SIM card according to the present invention.

FIG. 6 is a block diagram of a portable terminal 100 using a SIM card 10, according to the present invention. While in a battery mode, upon mounting the SIM card 10 to the portable terminal 100, contact pads are electrically connected to their corresponding connectors. That is, the aforementioned battery contact pads 13c, 13g, and 13h (see FIG. 3) are electrically connected to their corresponding connectors 41c, 41g, and 41h (see FIG. 4). In this case, the battery detection contact pad 13g connected to the battery cell 10 comes in contact with the connector 41g, thereby generating an electrical signal. Then, a switching element 50 provided inside the portable terminal 100 operates. The switching element 50 regards the SIM/battery contact pad 13c as a battery contact pad, and thus receives power supplied from the battery cell 10. Once the portable terminal is driven using power of the battery cell 10, an emergency call can be made using a pre-stored emergency call number under the control of a controller 60 even when the SIM card 10 does not operate.

According to the present invention, since a SIM card has an extra auxiliary battery cell, an emergency call can be made in an emergency situation even when a main battery pack is exhausted, thereby providing convenience in use.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A Subscriber Identification Module (SIM) card for a portable wireless terminal, the SIM card comprising:
    a SIM contact pad group which is exposed to an outer surface of the SIM card, and is electrically connected when the SIM card is placed in the portable terminal so as to identify subscriber information;
    a battery cell which is embedded in the SIM card, and is electrically connected when the SIM card is placed in the portable terminal so as to be used as an auxiliary power source for the portable wireless terminal;
    a battery contact pad group which is electrically connected to the battery cell and is exposed to the outer surface of the SIM card; and
    a mode change element which is disposed to a lateral side of the SIM card and by which either an auxiliary battery function or a SIM function is selected by a user's manipulation,
    wherein the SIM contact pad group includes six SIM contact pads, and
    wherein the battery contact pad group includes three battery contact pads that include a battery voltage contact pad for supplying power, a battery detection contact pad for detecting the battery cell, and a battery type recognition contact pad for recognizing a battery type.

2. The SIM card of claim 1, wherein the SIM contact pad group and the battery contact pad group are independently disposed.

3. The SIM card of claim 1, wherein some contact pads are commonly included in the SIM contact pad group and the battery contact pad group.

4. The SIM card of claim 1,
    wherein the six SIM contact pads of the SIM contact pad group are SIM_VCC, SIM_RST, SIM_CLK, SIM_GND, SIM_IO, and SIM_VDD, and
    wherein, in the battery contact pad group, the battery detection contact pad and the battery type recognition contact pad are disposed independently from the SIM contact pad group, whereas the battery voltage contact pad is used in common with the SIM contact pad SIM_VCC.

5. The SIM card of claim 4, wherein, when the SIM card is used for the purpose of subscriber identification, the three battery contact pads are not electrically connected to the battery cell.

6. The SIM card of claim 1, wherein the mode change element is a mode change key which is located at the lateral side of the SIM card and moves vertically to change a mode.

7. The SIM card of claim 6, wherein the mode change key includes connectors through which connection pads of the battery cell are selectively and electrically connected to the three battery contact pads by sliding the mode change key.

8. The SIM card of claim 7, wherein the connectors are metal plates through which the connection pads of the battery cell come in contact with the three battery contact pads.

9. The SIM card of claim 1, wherein the battery cell includes a Protection Circuit Module circuit.

10. The SIM card of claim 9, wherein the battery cell provides a voltage in the range of 3.4 to 4V.

11. A portable wireless terminal comprising:
a Subscriber Identification Module (SIM) card comprising a battery cell;
a socket on which the SIM card is mounted and which is electrically connected to the portable wireless terminal so as to be used as an auxiliary power source for the portable wireless terminal;
a switching element for switching between a SIM mode and a battery mode according to a mode of the SIM card mounted on the socket,
a SIM contact pad group exposed to an outer surface of the SIM card and electrically connected when the SIM card is placed in the portable terminal to identify subscriber information:
a battery contact pad group electrically connected to the battery cell and exposed to the outer surface of the SIM card: and
a mode change element disposed to a lateral side of the SIM card for selection of either an auxiliary battery function or a SIM function by user manipulation,
wherein the battery cell is embedded in the SIM card and is electrically connected when the SIM card is placed in the portable terminal,
wherein the SIM contact pad group includes six SIM contact pads or SIM VCC. SIM RST, SIM CLK, SIM GND, SIM 10, and SIM VDD, and
wherein, in the battery contact pad group, the battery detection contact pad and the battery type recognition contact pad are disposed independently from the SIM contact pad group, whereas the battery voltage contact pad is used in common with the SIM contact pad SIM VCC.

12. The portable wireless terminal of claim 11,
wherein the mode change element is a mode change key which is located at the lateral side of the SIM card and moves vertically to change a mode, and
wherein the mode change key includes metal plates through which connection pads of the battery cell are selectively and electrically connected to three battery contact pads by sliding the mode change key.

13. The portable wireless terminal of claim 12, wherein, when the SIM card is used for the purpose of subscriber identification, the three battery contact pads are not electrically connected to the battery cell.

14. The portable wireless terminal of claim 13, wherein the socket is a metal connector through which the subscriber identification contact point pads come in contact with the battery contact pads.

15. The portable wireless terminal of claim 14, wherein, when the SIM card is placed in the portable terminal while in the battery mode, the switching element operates such that the SIM card of the portable terminal changes from the SIM mode to the battery mode upon detecting an electrical connection of the battery detection contact pad.

* * * * *